(12) United States Patent
Lien et al.

(10) Patent No.: US 9,043,026 B2
(45) Date of Patent: May 26, 2015

(54) METHOD AND DEVICE FOR ACTUATING A KEY OF A KEYBOARD WITH A TRACER FINGER OF A ROBOT

(75) Inventors: Tam Lien, Düsseldorf (DE); Christoph Petlic, Dormagen (DE)

(73) Assignee: Vodafone Holding GmbH, Dusseldorf (DE)

( * ) Notice: Subject to any disclaimer, the term of this patent is extended or adjusted under 35 U.S.C. 154(b) by 1007 days.

(21) Appl. No.: 13/079,169

(22) Filed: Apr. 4, 2011

(65) Prior Publication Data
US 2011/0251719 A1 Oct. 13, 2011

(30) Foreign Application Priority Data
Apr. 8, 2010 (DE) .................. 10 2010 003 719

(51) Int. Cl.
| B25J 9/00 | (2006.01) |
|---|---|
| G06F 3/00 | (2006.01) |
| H04M 1/24 | (2006.01) |
| B25J 9/16 | (2006.01) |
| G06F 11/26 | (2006.01) |
| G06F 11/22 | (2006.01) |

(52) U.S. Cl.
CPC .............. *H04M 1/24* (2013.01); *B25J 9/1664* (2013.01); *B25J 9/1679* (2013.01); *G05B 2219/39535* (2013.01); *G05B 2219/40447* (2013.01); *G05B 2219/40503* (2013.01); *G06F 11/26* (2013.01); *G06F 11/2221* (2013.01)

(58) Field of Classification Search
CPC ... G06F 3/041; G06F 3/0488; G06F 11/2221; G06F 11/26; G06F 2203/04104; H04M 1/24; B25J 11/00; B25J 15/08; G01M 99/008; G01R 31/00; G05B 2219/45089; H01H 2229/018
USPC ................. 700/246, 253, 254, 257, 258, 262; 702/108, 116, 119, 120, 123
See application file for complete search history.

(56) References Cited

U.S. PATENT DOCUMENTS

| 8,061,223 | B2 * | 11/2011 | Pan .............................. 73/865.3 |
|---|---|---|---|
| 8,200,533 | B2 * | 6/2012 | Librizzi et al. ............. 705/14.37 |
| 2009/0265035 | A1 * | 10/2009 | Jenkinson et al. ............ 700/259 |
| 2009/0312009 | A1 * | 12/2009 | Fishel .......................... 455/425 |
| 2010/0149092 | A1 * | 6/2010 | Westerman et al. .......... 345/156 |
| 2012/0146956 | A1 * | 6/2012 | Jenkinson .................... 345/178 |
| 2012/0259591 | A1 * | 10/2012 | Chang ......................... 702/189 |
| 2012/0280934 | A1 * | 11/2012 | Ha et al. ...................... 345/174 |
| 2013/0046611 | A1 * | 2/2013 | Bowles et al. ............. 705/14.37 |
| 2013/0227348 | A1 * | 8/2013 | Stephenson et al. ........... 714/27 |

* cited by examiner

*Primary Examiner* — Jason Holloway
(74) *Attorney, Agent, or Firm* — International IP Law Group, PLLC

(57) ABSTRACT

There is provided a method for actuating a first key of a keyboard with a tracer finger of a robot. An exemplary method comprises acquiring parameters of the keyboard and determining a position of the first key as a function of the acquired parameters using a model of the keyboard. The exemplary method also comprises guiding the tracer finger of the robot to the determined position of the first key. The exemplary method additionally comprises actuating the first key with the tracer finger of the robot.

13 Claims, 4 Drawing Sheets

METHOD AND DEVICE FOR ACTUATING A KEY OF A KEYBOARD WITH A TRACER FINGER OF A ROBOT

CROSS REFERENCE TO RELATED APPLICATION

This application claims priority to German (DE) Patent Application No. 10 2010 003 719.2-32, filed on Apr. 8, 2010, the contents of which are incorporated by reference as if set forth in their entirety herein.

BACKGROUND

Terminal devices such as, for instance, mobile phones, are subjected to extensive tests in order to check that they are functioning properly. In order to ensure a realistic simulation of normal operating conditions, the terminal devices are operated using the interfaces that are also employed by the users to operate the terminal devices. In particular, this means that entries are made via the keyboards of the terminal devices.

In the past, such tests were conducted largely manually in that a terminal device tester operated the terminal device to be tested in accordance with the prescribed testing steps. However, in view of the ever-increasing variety of terminal devices to be tested and of programs that are run on them, such manual function tests have become very labor-intensive and time-consuming. For this reason, improvement possibilities are sought for the execution of the tests so as to reduce the investment in terms of time and money.

German patent application DE 10 2006 004 284 A1 discloses a test method for a technical device having a user interface. In particular, the method serves to test mobile communication terminal devices such as, for example, mobile phones. For purposes of carrying out the test, a control module controls a robot-assisted testing apparatus that uses a camera and a microphone to detect outputs of the device being tested. The detected outputs are evaluated in the control unit in order to automatically detect device functions. In order to operate the device being tested, the testing apparatus has a robot tracer finger that actuates a keyboard of the device being tested.

Due to the variety of terminal devices to be tested, the automated execution of the test encounters the problem that the robot-assisted testing system has to be adjusted to the specific keyboard of the terminal device in such a way that the robot tracer finger can operate the keyboard error-free during the test steps.

SUMMARY

Before this backdrop, a purpose of the subject innovation is to help perform the tests of the terminal devices as efficiently as possible. In particular, the subject innovation may allow error-free actuation of a key on different keyboards of terminal devices during the performance of tests in an efficient manner.

The subject innovation may be implemented as a method for actuating a first key of a keyboard with the tracer finger of a robot. An embodiment of the method may comprise the following process steps: acquiring the parameters of the keyboard, determining the position of the first key as a function of the acquired parameters using a model of the keyboard, guiding the tracer finger of the robot to the determined position of the first key and actuating the first key with the tracer finger of the robot.

The subject innovation may provide a device for actuating a first key of a keyboard of a terminal device. An embodiment of the device comprises a control module and a computation module, whereby the latter is configured to determine the position of the key as a function of the acquired parameters of the keyboard using a model of the keyboard. The control module may be configured to guide the tracer finger of the robot to the position of the first key determined in the computation module.

Moreover, the subject innovation may be implemented by a computer program that has been adapted in such a way that it can execute a method described herein.

The keyboard on which the first key is located may comprise an integral part of a terminal device, for instance, a communication terminal device. The first key can be actuated at the computed position using the tracer finger of the robot, especially during a test of the terminal device.

The subject innovation relates to a method for actuating a key of a keyboard using a tracer finger of a robot. Furthermore, the subject innovation relates to a device for actuating a key of a keyboard of a terminal device with a tracer finger of a robot. Moreover, the subject innovation relates to a computer program that is adapted in such a way that it can carry out one or more methods described herein.

Exemplary embodiments of the subject innovation may help to solve the problem mentioned above in that the positions of the keys can be computed in a simple manner. In particular, it is not necessary to individually measure the positions of the keys. This is due to the fact that, with this method, the positions of the keys can be computed from the acquisition of the parameters of the keyboard, making use of a selected model, and the tracer finger of the robot can be guided to the computed positions. This helps to ensure a fast and error-free execution of the test.

In one exemplary embodiment of the method and of the device, the model is selected from a plurality of models as a function of the type of keyboard detected.

In this manner, depending on the design of the keyboard, an adapted model can be selected in order to correctly determine the positions of the keys and to precisely guide the tracer finger of the robot to the determined position. This also means that the error rate during the activation of keys by the testing apparatus is reduced to such an extent as to ensure an error-free and quick execution of the test.

The keyboard can be configured in different versions and with different key assignments. The geometrical and functional properties of the keyboard make it possible to select the appropriate model from a number of different models and to ascertain the positions of the keys on the basis of the model. In particular, the models of various types of keyboards can encompass different numbers of rows and columns of keys.

In another exemplary embodiment of the method and of the device, the models are each associated with an arrangement of the keys in rows and columns having the same distances between the keys of one row and the keys of one column.

In another exemplary embodiment of the method and of the device, a first acquired parameter is the distance between two predefined keys of a row or the positions of other predefined keys of a row. The other keys preferably do not include the first key whose position is determined.

According to another exemplary embodiment of the method and of the device, a second acquired parameter is the distance between two predefined keys of a column or the positions of other predefined keys of a column. Again, the other keys preferably do not include the first key whose position is determined.

It has been found that, in many cases, one encounters essentially the same distances between adjacent keys of a column and/or between adjacent keys of a row. The above-mentioned exemplary embodiments of the subject innovation make use of this geometrical property of the keyboard. This makes it possible for the computation module in the testing apparatus to compute the positions of the other keys as a function of the distance of the keys of a column and/or of the distance of the keys of a row. This means that the computation is performed with a small number of necessary parameters, thus simplifying it.

The models used can provide for a rectilinear arrangement of the keys of a row or column. Here, the rows and columns can especially be arranged essentially at a right angle with respect to each other. Such models can describe a wide array of keyboards.

In some terminal devices, however, it can be the case that the rows and/or columns of keys are not arranged in a straight line, but rather in curve or arc. For this reason, in one exemplary embodiment of the subject innovation, at least one model provides for the keys of a row and/or of a column to be arranged along several straight lines in order to replicate or approximate the layout of the row or column.

Advantageously, the curved layout of the row or column of keys in this embodiment can be approximated on the basis of several straight lines. This even allows the positions of keys on keyboards with non-linear rows and/or columns to be ascertained in a simple manner.

In another exemplary embodiment of the method and of the device, the straight lines are minor-symmetrical with respect to a center axis in a plane of the keyboard.

In such a model, especially the positions of keys on keyboards having an arced layout of the rows and/or columns can be determined in a simple manner, whereby the minor-symmetry of the arcs can be utilized. In particular, the orientation of one straight line indicates the orientation of the other, mirror-symmetrical straight line without the need to determine it separately.

In an exemplary embodiment, another parameter is at least one gradient parameter that describes an orientation of at least one straight line.

The position of the straight lines can be determined on the basis of their orientation. In this manner, especially on the basis of a known key position of a row or column and additionally utilizing the distance between the keys of the row or column, the position of another key of the same row or column can be determined by following the straight line along an extension ascertained on the basis of the distance.

In another exemplary embodiment, the models differ in terms of the number of rows of keys and/or the number of columns of keys.

The various terminal device manufacturers make differently configured keyboards in which the number of rows and/or columns of keys can vary. This can also be due to the outer dimensions or special functional arrangements of the keyboard and of the display of the terminal device. In order to accommodate future developments, several models are provided that make it possible to determine the positions of the keys on key panels having different keyboard designs.

In another exemplary embodiment, a first model provides for the keys to be arranged in three columns and four rows.

It has been found that such a model allows the replication especially of the keyboards of a wide array of communication terminal devices.

In an exemplary embodiment, a first model is employed to determine the position of a key on a reduced key panel in which several letters are assigned to one key.

Due to their multiple key assignment, such keyboards may employ a small number of keys and thus a smaller surface area. This is why such keyboards are often used in compact communication terminal devices such as, for example, mobile phones. Defining a first model for the type of keyboard of a reduced key panel that encompasses the aspect of multiple key assignment makes it possible to determine the positions of the keys on such keyboards that are employed in a wide array of terminal devices on the basis of this model.

In one exemplary embodiment, a second model provides for the keys to be arranged in ten columns and three rows. Here, in an exemplary embodiment of the method and of the device, a second model is employed to determine the position of a key on a complete keyboard panel. Such an exemplary embodiment is characterized in that precisely one key is provided for each letter.

Such keyboards are often used for less compact communication terminal devices in order to make it more convenient to enter text, or in order to reduce their size to such an extent that they can also be employed in compact devices. Defining a second model for this type of keyboard makes it possible to actuate the keys of this type of keyboard, which is likewise employed in a wide array of terminal devices in this group of key panels on the basis of the determined positions.

BRIEF DESCRIPTION OF THE DRAWINGS

The above-mentioned as well as additional advantages, special features and practical refinements of the subject innovation will also be described on the basis of the embodiments, which will be illustrated below making reference to the figures.

DETAILED DESCRIPTION OF SPECIFIC EMBODIMENTS

Figure 1:
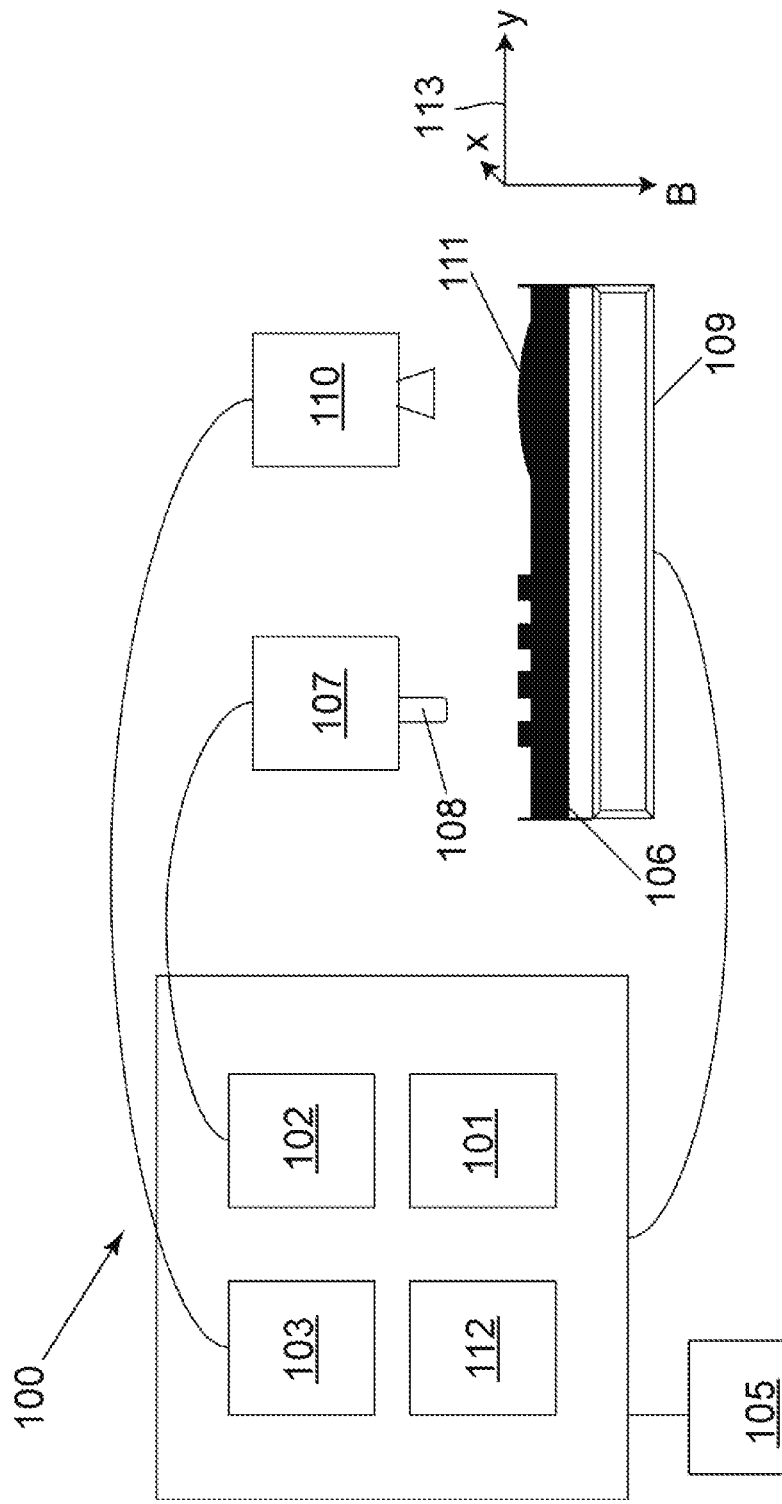
FIG. 1 is a block diagram of a testing apparatus for testing terminal devices.

FIG. 1 shows a testing apparatus 100 which, in the embodiment shown by way of an example, comprises a computation module 101, a control module 102 and an evaluation and recording module 103 as well as a user interface 105. The testing apparatus 100 comprises electronic and mechanical components such as, for instance, a server device or a computer device for purposes of carrying out automated tests.

So that they can be operated by a user, the terminal devices 106 to be tested have input and output device comprising a keyboard. Furthermore, the input and output device preferably comprise a display module 111 with which the terminal device 106 can implement visual outputs and which can be configured as a display. Moreover, acoustic input and output device such as a microphone and a loudspeaker can also be provided. An example of a terminal device 106 that can be tested using the testing apparatus is a mobile communication terminal device such as, for instance, a mobile phone, a PDA (personal data assistant), a portable computer and the like. Other examples are digital cameras, navigation devices, game consoles and medical devices, insofar as they have a keyboard.

By virtue of the computation module 101, the acquired parameters and a model that can be selected from a plurality of models are employed to determine the positions of keys on a keyboard of a terminal device 106 that is to be tested. The computation module 101 is configured, for example, as a programmable microprocessor that is designed to execute computations in order to determine the positions of the keys on the keyboard of the terminal device 106. Advantageously, the computation module 101 performs the computations during the test or before the actual execution of the test on the basis of selected models.

The control module 102 is connected via signals to the computation module 101 and it receives the positions of the keys determined by the computation module 101 on the basis of the selected model. The control module 102 transmits control commands to an actuator unit 107 which moves a mechanical tracer finger 108 of a robot in order to actuate keys on a terminal device 106. On the basis of the ascertained values from the computation module 101 and on the basis of corresponding control commands to the actuator unit 107, the control module 102 is able to guide the tracer finger 108 of a robot to a determined position of a desired key and is able to actuate the key on the keyboard of a terminal device 106 using the actuator unit 107.

The correct determination of the positions of the keys is a prerequisite for actuating the desired key of a keyboard during a subsequent test run and thus for ensuring an error-free execution of the test.

The control module 102 is, for example, a microprocessor-controlled circuit that is configured to generate and transmit control signals, for instance, in order to control or guide robot devices such as a testing robot or a robot arm or a robot tracer finger 108.

The control module 102 receives instructions for generating control signals and control commands for controlling the tracer finger 108 of a robot from a testing program module 112 according to a prescribed test routine. In particular, the testing program module 112 prescribes which key or sequence of keys is to be actuated by the tracer finger 108 of the robot in each instance. A test routine comprises a sequence of test steps that have to be performed in order to check the functionality of a terminal device. These test steps comprise checking the sending and receiving of short SMSs, e-mails, multimedia messages, also checking the correct input of letters and numbers, checking the correct storage of names and phone numbers or the browser functions of the terminal device.

The terminal device 106 is clamped in a holding structure 109 in order to ensure a reliable and error-free execution of the test. The holding structure 109 can be configured, for example, as a frame made of metal or of another material. The holding structure 109 comprises mechanical elements arranged on the frame that are designed to temporarily hold all kinds of terminal devices 106 of various weights, sizes and shapes. This can be, for example, a clamping apparatus that holds the terminal device 106 using a movable spring mechanism or another apparatus in which the terminal device 106 is affixed to brackets using screws. Moreover, the holding structure 109 has a power supply connection for purposes of supplying the terminal device 106 with power during a test, and a data-transmission interface so that, during the test, static and dynamic data can be transmitted as information from the terminal device 106 via the data-transmission interface to the evaluation and recording module 103.

The tracer finger 108 of the robot is arranged in the area of the holding structure 109, in particular, it is arranged above the holding structure 109, in such a way that it can operate keyboards of terminal devices 106 that have been placed into the holding structure 109. Positions in a plane relative to which the keyboard plane of the terminal device to be tested is also oriented can be described in a two-dimensional coordinate system 113 with an x-axis and a y-axis positioned at a right angle thereto. In order to actuate a key, the tracer finger 108 of the robot is guided to the position of the key in the coordinate plane; then the key is actuated by a movement of the tracer finger 108 of the robot in a direction B perpendicular to the coordinate plane.

Furthermore, the testing apparatus 100 has a camera unit 110 that especially serves to acquire images of a display module 111 and that can be positioned accordingly. The camera unit 110 is electronically connected to the evaluation and recording module 103. The transmitted images of the display module 111 can be evaluated and/or recorded in the evaluation and recording module 103. Within the scope of an evaluation, numbers and/or letters or graphic representations as well as color information can all be detected or recognized in such an image during a test run. The output information can be evaluated on the basis of the images, whereby, in particular, it can be checked whether the acquired output matches an expected output or not. The module 103 can record the evaluation result and store it in the storage unit located in the evaluation and recording module 103.

Furthermore, images of the keyboard or of the key panel of the terminal device 106 are acquired. The camera unit 110 or another camera unit not shown in FIG. 1 can likewise be employed for this purpose. The images of the keyboard can likewise be transmitted to the evaluation and recording module 103, where the images can especially undergo a text-recognition and/or object-recognition procedure. Preferably, the images of the keyboard can be depicted on the display unit of the user interface 105. The points of the image can be associated with positions, especially with coordinates of the coordinate system 113, on the basis of the known properties of the optical system of the camera unit 110 and of the arrangement relative to the keyboard or to the holding structure.

The user interface 105 of the testing apparatus 100 is equipped with one or more input devices that can be configured, for instance, as a keyboard or a microphone. In particular, via the input device or via voice commands, the interface 105 allows a user to acquire or enter parameters of the keyboard of a terminal device 106 that is to be tested.

In order to be able to test a terminal device 106 using the testing apparatus 100, aside from the other test preparations, it is also necessary to pre-set the testing apparatus to the type of terminal device 106, so that later the test steps can be carried out correctly and without errors during a test run. This includes establishing the positions of the keys of the terminal device. There are many types of terminal devices whose keyboards are configured differently. In particular, they differ in terms of the arrangement and position of the keys on the keyboard or on a key panel.

In the existing key panels, the keys are usually arranged in rows and columns. Different types of keyboards differ in terms of the number of keys and correspondingly in terms of the number of rows and columns. It can be the case that, depending on the design specifications, each row of keys has keys which are arranged in uniform rows or in rows with differently curved layouts. By the same token, the outer shape of the terminal devices can require the rows of keys to be arranged, for example, in circles or along some other kinds of curves. In different keyboards, as a rule, the assignments of the keys and the sequence in which the keys are arranged on the keyboard essentially match. This means that one key with a specific assignment in the keyboards of a given type is normally arranged adjacent to keys having another predefined assignment. The positions of the individual keys, however, are regularly different on the different keyboards of the same type.

In order to be able to take variants of key arrangements into consideration, different models have been developed that make it possible to determine positions of keys on a key panel of any desired configuration. The models provide that the keys are arranged in rows and/or columns. The rows each comprise keys that are arranged consecutively along a line. Different rows are formed by keys along lines running next to each other. A column is made up of keys of several rows that, in turn, run along a line and, in each case, a column contains one key of the various rows. The predefined models especially encompass a certain number of rows and columns as well as a specific assignment of the keys.

Furthermore, the predefined models each comprise a certain layout of the rows and columns. In this context, the models especially can provide for a straight layout of the rows and columns in which the columns run at a right angle to the rows. In particular, in one orientation of the keyboard, the rows can be formed by horizontal straight lines and the columns by vertical straight lines. Various models having such an arrangement of the rows and columns differ in terms of the number of rows and columns. Numerous keyboards can be replicated with such models.

Furthermore, however, there are also keyboards in which the rows and/or columns do not have a straight layout but are curved instead. In particular, the rows of keys can be configured so as to be in an arc. Moreover, other curved arrangements such as, for instance, circular arrangements of the rows are likewise conceivable. In order to replicate such keyboards, models are provided that approximate the layout of the rows and columns in an appropriate manner.

In an embodiment of such models, the layout of the rows and columns is approximated by straight lines in certain sections. In various sections, the straight lines can have different directions that are each described by a parameter that is referred to here as a gradient parameter. By the same token, an approximation can be made on the basis of curved lines. The curves can be defined in sections or as a complete description of the layout and are likewise characterized by gradient parameters that describe their orientation and/or curvature.

The models used provide that, between the keys in the same row, the same distance exists between adjacent keys. Preferably, it is also assumed that the same distance exists between adjacent keys in all of the rows. Analogously, the models provide that the distances are the same between the keys of the same column. Here, it is preferably likewise assumed that the distances are the same between adjacent keys in different columns of a keyboard. Below, the distance between two adjacent keys of a row will be designated as $\Delta x$ and the distance between two adjacent keys of a column as $\Delta y$.

For purposes of determining the positions of the keys on a keyboard on the basis of a model stored in the computation module 101, first the type of keyboard is ascertained and a model related to that type of keyboard is selected. As mentioned above, the model selected is the one that provides for a number of rows and columns that matches the number of rows and columns of a given keyboard. Moreover, the model can be selected in accordance with the actual layout of the rows and/or columns.

In one embodiment, the appertaining type of keyboard of a terminal device 106 that is to be tested is ascertained by the operator of the testing apparatus and this is acquired or entered using the user interface 105. When the operator enters this information, he can select the type of keyboard, for example, from a list containing the types of keyboards for which a model is available in the computation module 101. The type of keyboard, however, can also be determined using automatic object recognition on the basis of an image of the keyboard. On the basis of the input or selection, the computation module performs the subsequent computation of the positions of the keys using the model that belongs to that type of keyboard.

Moreover, in order for the positions of the keys to be computed, parameters are acquired of the keyboard of the terminal device 106 that is to be tested. The parameters encompass the position of a first predefined key, that is to say, a first key with a predefined key assignment.

In addition, for purposes of computing the positions of the keys, the distance $\Delta x$ between adjacent keys of a row of the keyboard of the terminal device 106 to be tested is used. This distance can be measured directly on the keyboard. Alternatively, the positions of two predefined keys of one row are detected and then the distance is computed on the basis of these positions. These can be two adjacent keys or else predefined keys between which there are a number of keys. The distance $\Delta x$ results from the detected distance of the predefined keys divided by the number of keys located between them, reduced by one. Preferably, one of the keys is the above-mentioned first key while the other key is another key whose position is detected in addition to the position of the first key.

Furthermore, the computation module 101 utilizes the distance $\Delta y$ between two adjacent keys of a column for the model-based computation of the positions of the keys. This distance can likewise be measured directly or else determined from the positions of two predefined keys in one column. In this context, these do not have to be adjacent keys but rather, there can also be additional keys between the keys whose positions have been detected. As in the case of the positions of the keys of one row, it is preferably provided that one of the two keys whose positions are used to determine the distance $\Delta y$ is the above-mentioned first key, while the position of the second key is determined in addition.

One or more gradient parameters are ascertained in the case of a model that has curved rows and/or columns. These gradient parameters serve to determine the approximation of the layout of the curved rows or columns and can also be determined from the positions of several predefined keys of the curved rows and/or curved columns. In the case of the above-mentioned approximation using straight lines, the gradient parameters match the gradients of the straight lines or their angle relative to an axis of the coordinate system 113. These parameters can be ascertained in a familiar manner that will still be elaborated upon below on the basis of the positions of two keys that are located in the section of a row or of a column that has been approximated using the corresponding straight line.

If the various rows of a keyboard or the various columns of the keyboard of the terminal device to be tested run at least approximately parallel, then preferably a model with parallel rows or columns is selected. In order to compute the positions of the keys using such a model, the gradient parameters only have to be ascertained for one row or column. Moreover, the minor symmetry of the arrangement can be used, for instance, if a row or column is arranged in an arc. As is explained below, a first straight line for the approximation of a first section of a row or column can here especially be minor-symmetrical to a second straight line for the approximation of a second section of the row. In this case, the gradient parameter only has to be determined for the first straight line. It likewise defines the layout of the second straight line.

The positions of the keys used refer to the coordinate system 113 in which the tracer finger 108 of the robot is also controlled. They can be determined in different ways. In one embodiment, an image of the keyboard is used in order to determine the positions. In this image, the operator of the testing apparatus uses the user interface 105 to mark the key(s) whose position is to be determined (preferably, each marking is applied in the center of the key). Then, the coordinates that match the markings are ascertained in the evaluation module 103 or in the computation module 101. As an alternative to the manual marking, it is also possible to provide for an automatic recognition and marking of the predefined keys using automatic object or text recognition.

The terminal device 106 to be tested is preferably arranged in the holding structure 109 in such a manner that (non-curved) keyboard rows extend along the x-axis of the coordinate system 113 and/or (non-curved) keyboard columns extend along the y-axis of the coordinate system 113.

Using the above-mentioned parameters, the computation module can determine the positions of all of the keys on the keyboard of the terminal device to be tested. This is done, for instance, on the basis of the above-mentioned first key. In this context, for instance, the position of a key that is in the same row as the first key or another key whose position has already been ascertained can be determined in that the layout of the row is followed along a given distance. If applicable, the layout of the row results especially from the gradient parameter or gradient parameters. The distance is $(i+1)\Delta x$, wherein i stands for the number of keys located between the appertaining key and the key whose position is known. Accordingly, the position of a key located in the same column as the key whose position is already known can be determined in that the layout of the corresponding column is followed along a given distance. The distance here is $(i+1)\Delta y$, wherein i, once again, stands for the number of keys located between the appertaining key and the key with the known position.

Figure 2:
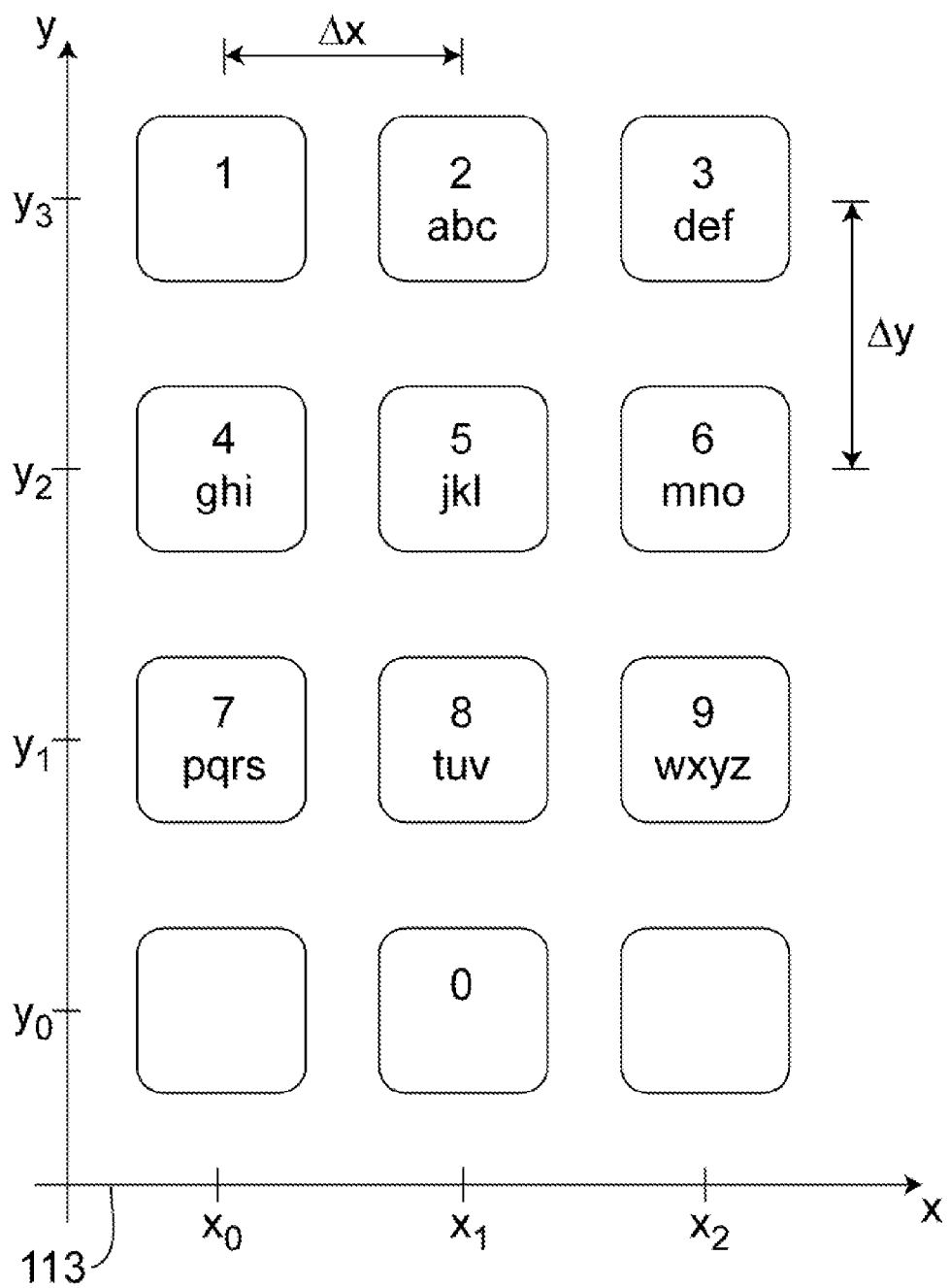
FIG. 2 is a block diagram of a reduced key panel of a terminal device.

A few types of keyboards as well as the associated models will be presented below by way of an example, and it will be explained how the positions of the keys are determined for these types of keyboards:

The first type of keyboard is a reduced key panel with which the mobile phone can be kept compact in terms of its appearance and dimensions. With this reduced key panel, at least some of the keys have multiple assignments, especially several letters. As a model, such a reduced key panel is assumed to be a panel consisting of a number of rows and a number of columns FIG. 2 shows the functional key assignment of a keyboard of a terminal device 106 and shows that the key panel consists of four rows and three columns. According to FIG. 2, the key in the first row and first column is assigned the number "1". Entering and displaying this number is accomplished by actuating the key one time. The next key in the first row and second column is assigned the number "2" as a function. Furthermore, this key, as can be seen in FIG. 2, is associated with the letters A, B and C as further functions. Entering the letter "B" can be done by actuating this key twice. The operation of such a keyboard of a terminal device 106 is known to the person skilled in the art, so that at this juncture, there is no need to elaborate on the individual or other functions and on the operation of keyboards.

For terminal devices 106 with a reduced key panel, the type of keyboard is first ascertained either by the tester or else automatically, and this type can be ascertained by detecting the arrangement of rows and columns with respect to each other on the key panel. In this context, several models can be provided for reduced key panels, and these models differ in terms of the number of rows and columns. Moreover, models can be provided for straight and curved rows and/or columns. In the case shown in FIG. 2, the key panel comprises three columns and four rows that are arranged in a straight line and at a right angle with respect to each other.

Once the appropriate model has been selected, the position of three predefined positions of the keys can be detected, for instance, key "1", key "2" and key "4" with their coordinates, as shown in FIG. 2. In this manner, on the basis of the selected model, the distance between two adjacent keys of the same row can be determined from $\Delta x = x1 - x0$. The distance between two adjacent keys of the same column is ascertained according to $\Delta y = y2 - y1$. Three other keys from the key panel can also be detected, provided that two keys from the same row and two keys from the same column are always selected. Gradient parameters do not have to be acquired in view of the rectilinear layout of the rows and columns parallel to the axes of the coordinate systems 113.

Figure 3:
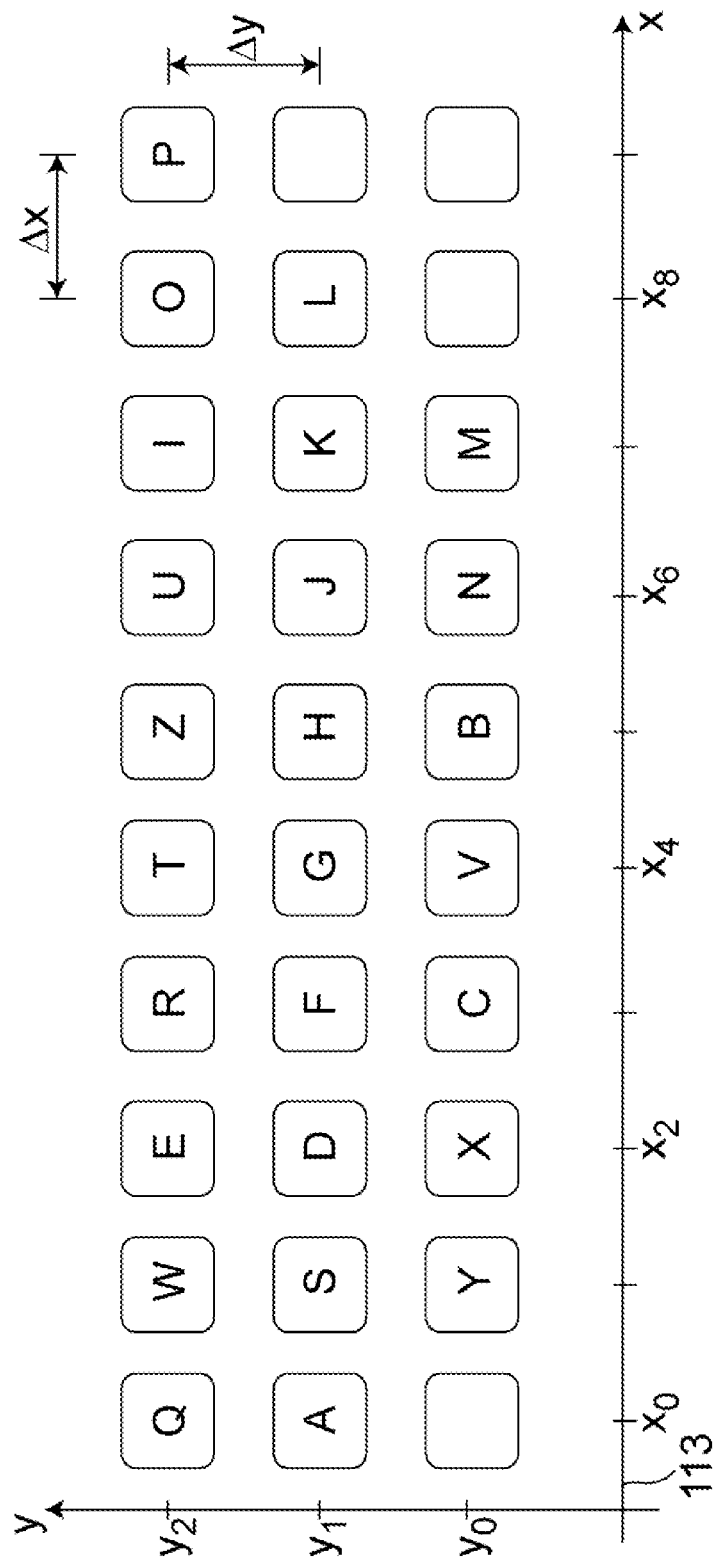
FIG. 3 is a block diagram of a complete keyboard of a terminal device.

The second type of keyboard relates to a complete key panel, as shown in FIG. 3. This type differs from the preceding one in that each letter is associated with exactly one key. According to the arrangement of keys of the complete key panel depicted in FIG. 3, a model is selected that comprises three rows and ten columns of keys and that provides for a rectilinear, right-angled arrangement of the rows and columns. As shown in FIG. 3, on the basis of the above-mentioned generally described assumptions for this model, the distance $\Delta x$ is determined from the distance between the "Q" and "T" keys, and the distance $\Delta y$ is determined from the distance between the "Q" and "A" keys. As already mentioned above for the models, three other keys can also be selected in accordance with the described rules, whose positions are determined as model parameters or in order to ascertain the model parameters.

Figure 4:
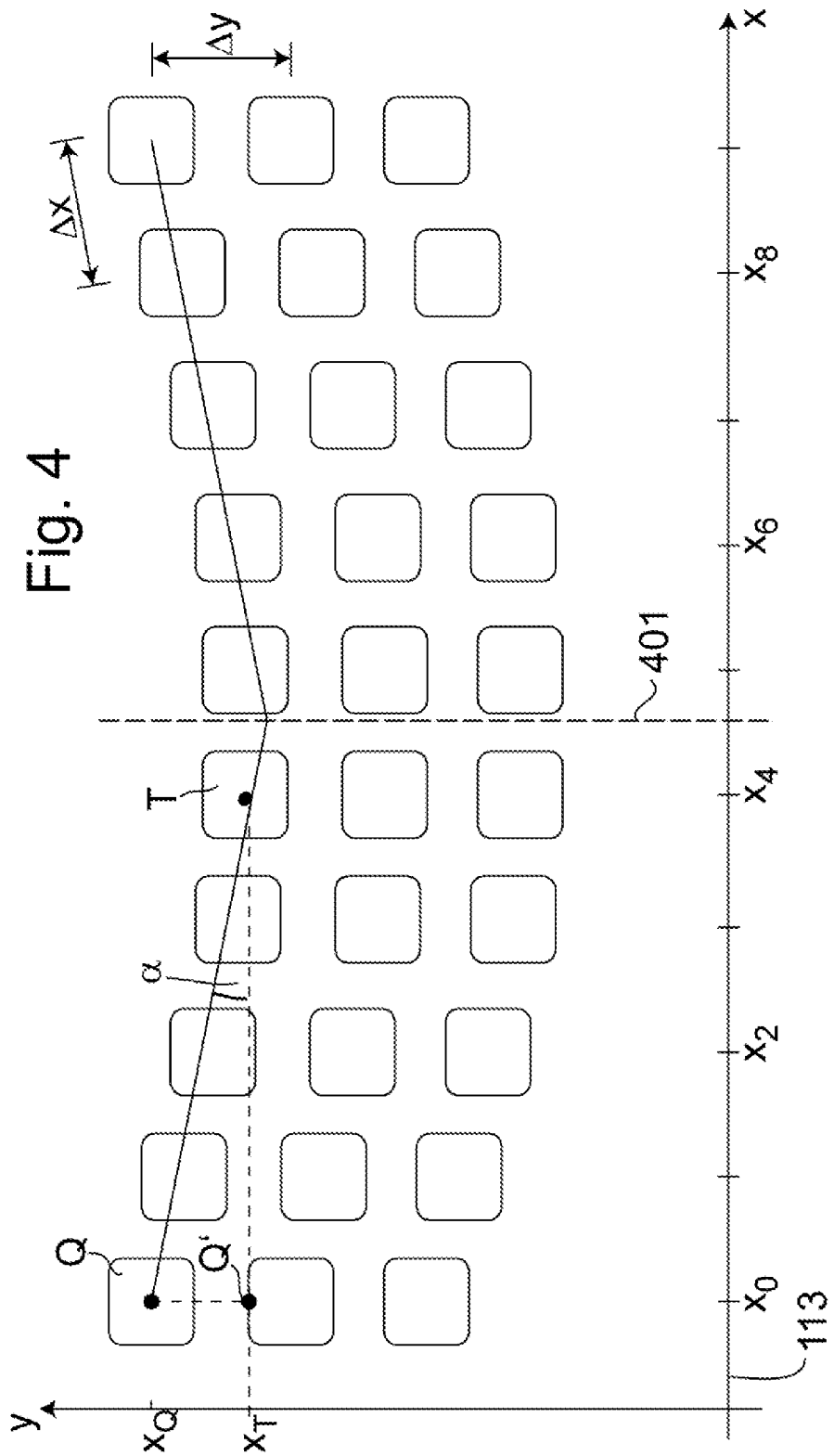
FIG. 4 is a block diagram of a complete keyboard of a terminal device with rows of keys arranged in an arc.

In another example that is shown in FIG. 4, the terminal device 106 can have a keyboard in which the keys are arranged in a curve or arc. The configuration shown is a complete keyboard with arced rows. A similar arced arrangement, however, can also be present in terminal devices with a reduced key panel.

In the keyboard shown, the arced rows run parallel to each other. The arc is approximated by two straight lines which, like the arc as well, are arranged mirror-symmetrically relative to an axis of symmetry 401. In order to compute the positions of the keys in the model, it is necessary to determine not only the distances of the adjacent keys of the rows and columns, but also a gradient parameter. The latter matches, for instance, the angle $\alpha$ between a straight line and the x-axis of the coordinate system (whose y-axis is arranged parallel to the columns of the keyboard).

As schematically illustrated in FIG. 4, the gradient parameter $\alpha$ can be ascertained from the angle between the connection line of the "T" and "Q" keys with their length X and the connection line Z that is at a right angle relative to the axis of symmetry of the key panel, whereby Z connects the "T" key to the "Q'" point. When the position of the "Q" key is designated by (x0, yQ) and the position of the "T" key by (x4, yT), the angle $\alpha$ can be approximately calculated from the following:

$$\tan \alpha = (yT - yQ)/(x4 - x0)$$

The distance $\Delta x$ between adjacent keys of a row likewise results from the detected positions of the "Q" and "T" keys, especially from the following:

$$\frac{X}{4} = \frac{1}{4}\sqrt{(x4-x0)^2 + (yQ-yT)^2}$$

The distance Δx can be ascertained, for example, on the basis of the detected positions of the "Q" key and of another key in the first (left-hand) column of the keyboard.

The positions of the keys on the keyboard of the terminal device to be tested are determined, as explained above, in the computation module 101. In one embodiment, the computation for all of the keys is undertaken before the start of the actual testing of the device. At the end of the computations, the determined positions can be stored in the evaluation and recoding module 103 and transmitted to the control module 102. During the test run, the control module 102 then uses these determined positions to guide the actuator unit 107 with the tracer finger 108 to the position of a desired key, so that the tracer finger 108 can actuate the key error-free.

The storage of the positions of the keys in the memory module 104 also makes it possible for the local tester to later carry out the required tests faster if an identical terminal device 106 is to be tested. In particular, the positions of the keys can be retrieved again in such a case, without the need to perform the computation anew.

In the manner described above, especially when an error occurs during a test routine as described above, the terminal devices 106 can be checked for purposes of finding the cause of the error. Moreover, such terminal devices 106 can be checked for their error-free functioning prior to being sold or introduced onto the market. If these devices 106 are to be sold in large numbers such as is usually the case, for instance, with communication terminal devices, the test can also be limited to one or more selected devices since testing all of the devices manufactured would be too time-consuming. In such a case, however, the proper functioning of identical devices can be ascertained with a high level of reliability.

Even though the subject innovation was described in detail in the drawings and in the elaborations above, these are meant for illustration purposes and as examples, and should not to be construed as being limiting in any manner whatsoever; in particular, the subject innovation is not restricted to the embodiments explained. The person skilled in the art can glean other variants of the subject innovation and their execution from the preceding disclosure, from the figures and from the patent claims.

In the patent claims, terms such as "encompass", "comprise", "contain", "have" and the like do not exclude additional elements or steps. The use of the indefinite article does not preclude the plural. Each individual device can execute the functions of several of the units or devices cited in the patent claims, The reference numerals indicated in the patent claims are not to be construed as a limitation of the means and steps employed.

What is claimed is:

1. A method for establishing positions of keys of a keyboard of a terminal device for actuating a first key of a keyboard of the terminal device with a tracer finger of a robot of a testing apparatus, the method comprising:
   detecting a keyboard to be tested via the testing apparatus;
   selecting a model by a computation module of the testing apparatus from a plurality of models as a function of a type of the detected keyboard, whereby the selected model is one of the plurality of models, whereby the plurality of models are each associated with an arrangement of the keys in rows and columns having a same distance between keys of one row and keys of one column;
   acquiring parameters of the detected keyboard via an interface of the testing apparatus, whereby a first acquired parameter is a distance between two predefined keys of a row of the detected keyboard, and a second acquired parameter is a distance between two predefined keys of a column of the detected keyboard,
   determining, by the computation module, a position of the first key to be actuated as a function of the first acquired parameter or the second acquired parameter using the selected model of the keyboard;
   guiding, by a control module, the tracer finger of the robot to the determined position of the first key; and
   actuating, by the control module, the first key with the tracer finger of the robot.

2. The method recited in claim 1, wherein a one of the acquired parameters is a distance between two predefined keys of a column or the positions of other predefined keys of a column.

3. The method recited in claim 1, whereby the model provides for the keys of a row and/or of column to be arranged along several straight lines.

4. The method recited in claim 3, wherein the straight lines are mirror-symmetrical with respect to a center axis in a plane of the keyboard.

5. The method recited in claim 3, whereby a one of the parameters is at least one gradient parameter that describes an orientation of at least one straight line.

6. The method recited in claim 1, wherein the model is one of a plurality of models that differ in terms of the number of rows of keys and/or the number of columns of keys.

7. The method recited in claim 1, whereby the model provides for the keys to be arranged in three columns and four rows.

8. The method recited in claim 7, the model being employed to determine the position of a key of a reduced key panel.

9. The method recited in claim 7, whereby a second model provides for the keys to be arranged in ten columns and three rows.

10. The method recited in claim 1, comprising employing a second model to determine a position of a key of a complete keyboard panel.

11. One or more non-transitory computer-readable storage media, comprising code to actuate a first key of a keyboard of a terminal device with a tracer finger of a robot, the code configured to direct a processing unit to:
    detect a keyboard;
    select a model from a plurality of models as a function of a type of the detected keyboard, whereby the model selected is one of the plurality of models, whereby the plurality of models are each associated with an arrangement of keys in rows and columns having a same distance between keys of one row and keys of one column
    acquire parameters of the detected keyboard, whereby a first acquired parameter is a distance between two predefined keys of a row of the detected keyboard, and a second acquired parameter is a distance between two predefined keys of a column of the detected keyboard;
    determine a position of the first key to be actuated as a function of the first acquired parameter or the second acquired parameter using the selected model of the keyboard;
    guide the tracer finger of the robot to the determined position of the first key; and
    actuate the first key with the tracer finger of the robot.

12. A device for actuating a key of a keyboard, comprising a control module, a computation module, and an interface, the interface being configured to detect a keyboard, select a model from a plurality of models as a function of the type of the keyboard detected, whereby the model selected is one of the plurality of models that are each associated with an arrangement of the keys in rows and columns having a same distance between the keys of one row and the keys of one column, the computation module being configured to determine the position of the key to be actuated as a function of the first acquired parameter or the second acquired parameter, and the control module being configured to guide the tracer finger of the robot to the position of the first key determined in the computation module.

13. The method recited in claim 1, whereby the first acquired parameter is a distance between positions of other predefined keys of a row.

\* \* \* \* \*